May 28, 1935.  A. Y. DODGE  2,003,107
LUBRICATING DEVICE
Filed Oct. 15, 1932
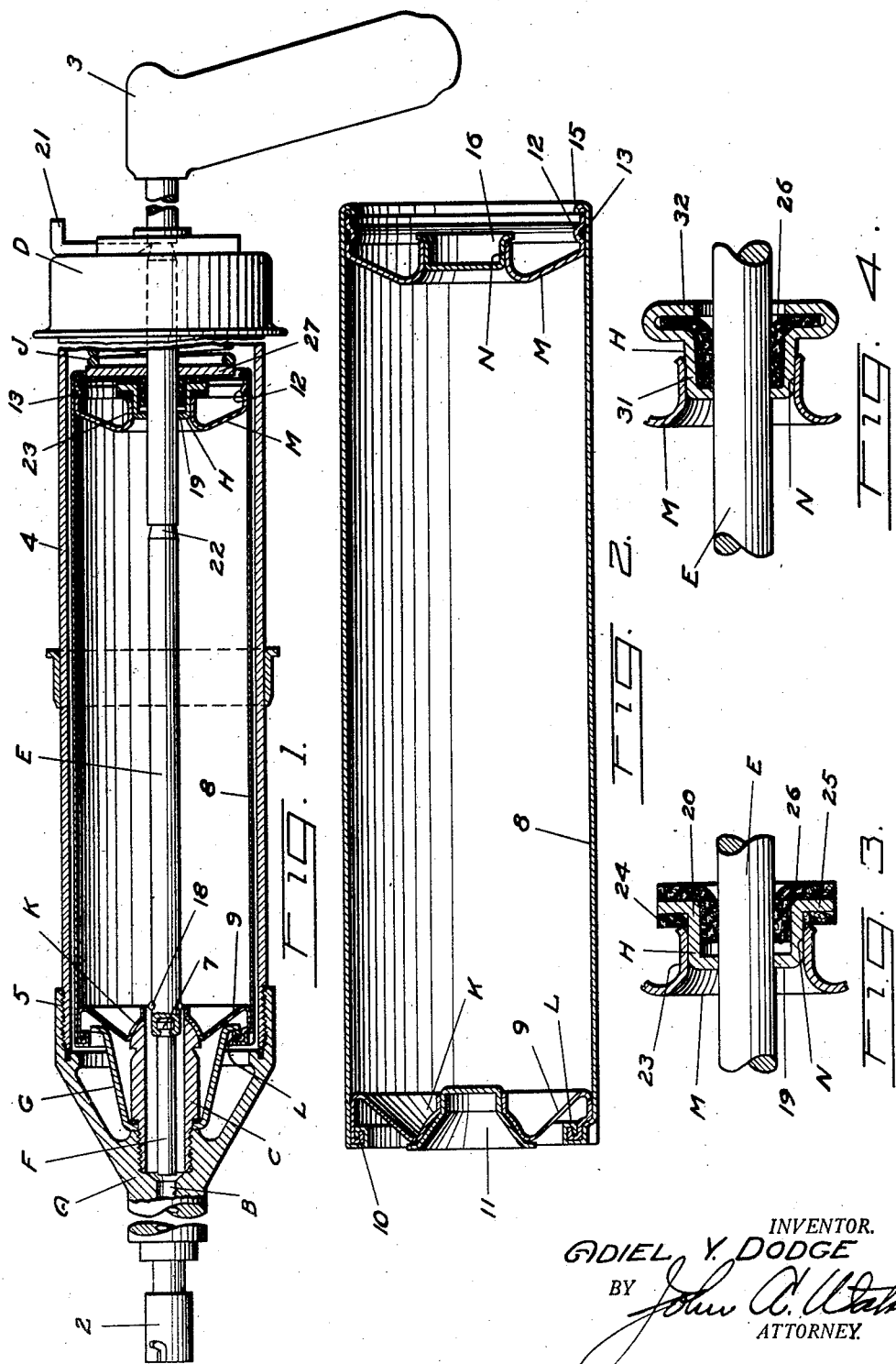
INVENTOR.
ADIEL Y. DODGE
BY
ATTORNEY.

Patented May 28, 1935

2,003,107

UNITED STATES PATENT OFFICE 2,003,107

LUBRICATING DEVICE

Adiel Y. Dodge, South Bend, Ind., assignor to The Lubrication Corporation, South Bend, Ind., a corporation of Delaware Application October 15, 1932, Serial No. 637,921

14 Claims. (Cl. 221—47.4)

This invention relates to improvements in lubricating devices and more particularly to lubricant cartridges for use in lubricating guns or similar lubricant feeding apparatus.

An object of the invention is to provide a cartridge for lubricating guns which when in place upon the gun, presents a direct coaxial continuation of the high pressure gun cylinder thereby facilitating the charging of the gun cylinder with lubricant from within the cartridge.

Another object is to provide a lubricant cartridge for use with a lubricant gun wherein the high pressure piston and piston operating plunger of the gun is located within the cartridge and free to reciprocate along the longitudinal axis of the gun to cause the high pressure piston to enter and traverse the axis of the aligned and directly communicating high pressure cylinder. This novel arrangement precludes the loss of lubricant through any slight leakage which might occur between the piston and cylinder walls and further aids in the complete charging of the gun cylinder.

A further object is to provide a lubricant cartridge having a centrally apertured cartridge piston through which the gun piston operating plunger may extend and sealing means forming a part of the gun assembly for establishing a lubricant tight seal between the cartridge piston and gun piston plunger. This arrangement aside from establishing a movable closure wall for the rearward end of the cartridge provides the additional function of guide means for the piston plunger to aid in the alignment between the gun piston and the high pressure cylinder.

Another object is to provide a gun and cartridge assembly as described wherein the spring for urging the cartridge piston against the lubricant in the cartridge functions to aid and maintain the sealing relationship between the cartridge piston and piston plunger through thrust applied to said sealing means therefor.

Other objects, the advantages, and uses of the invention, will be or should become apparent after reading the following description and claims and after consideration of the accompanying drawing forming a part of this specification, in which:

Fig. 1 is an elevation partly in section of a hand lubricant gun and cartridge therefor constructed in accordance with the invention;

Fig. 2 is a sectional view of the lubricant cartridge illustrated in Fig. 1 prior to its disposal within the gun;

Fig. 3 is an enlarged fragmentary view of the cartridge piston and gun plunger sealing mechanism of Fig. 1; and Fig. 4 is a view similar to Fig. 3 of another form of the sealing mechanism.

In general the embodiment of the invention selected for illustration herein includes a lubricant gun of the hand type, comprising, a head casting A having a high pressure cylinder B formed therein the rearward end of which communicates with a tubular cartridge connector stud C fixed to the body, a barrel or casing secured to the body A having at its rearward end a removable cap D through which a manually operable piston plunger rod E is mounted for reciprocation, a high pressure piston F carried by the plunger rod E for reciprocation into the cylinder B, a cartridge connector plate G secured between the body A and the connector stud C, and a spring pressed cartridge piston mounting and sealing member H slidably mounted upon the plunger E and urged toward the body A under the influence of a spring J. The cartridge for the gun is cylindrical in shape having an outlet opening the walls K of which are formed to provide sealing engagement with a stud C and further includes bayonet lugs L for securing the cartridge by bayonet action upon the connector plate G and for drawing the cartridge toward the plate, and a piston M forming the rearward end wall of the cartridge having an aperture N centrally therethrough the walls of which are formed to embrace the outer walls of the member H whereby the cartridge piston may be urged forwardly by the spring J and a lubricant tight seal established between the piston and the plunger rod E.

Referring particularly to Figs. 1 to 3, inclusive, the lubricant gun may be provided with a discharge nozzle 2 fixed to the body member A and in communication with the forward, or discharge, end of the cylinder B and a hand grip 3 fixed to the rearward end of the plunger rod E to facilitate the manual operation of the gun by thrust applied thereto in the direction of the nozzle 2. The barrel 4 of the gun may be of metal tubing secured to the body A by screw threads 5 so that if desired the barrel may be removed from the body for the mounting of the cartridge upon the body instead of inserting the cartridge into the barrel by removal of the cap D. The cartridge connector stud C is of sufficient internal diameter to provide a relatively wide space between its inner walls and the walls of the piston F so that lubricant may freely pass about the piston into the high pressure cylinder B when the piston F is in the position shown in Fig. 1. The length of the stud C is substantially that of the piston F including the joint 7 between the piston and its supporting plunger rod E. This arrangement assures the travel of the cartridge piston M along the rod E the full length of the cartridge thereby providing for the complete transfer of lubricant therefrom into the cylinder B under force applied to the cartridge piston by the spring J as the gun is operated.

The lubricant cartridge, as is best shown in Fig. 2, comprises a cylinder 8 preferably of sheet metal, having a head plate 9 secured at one end by a lock seam 10 and having the bayonet lugs L formed in the lock seam thereby obtaining maximum strength and rigidity in the lugs. The end plate 9 is outwardly dished and that portion at its periphery secured by seam to the cylinder is extended forwardly for a short distance parallel with the inner wall of the cylinder thus lending flexibility to the end plate along the axis of the cartridge sufficient to assure at all times a constant end thrust between the outlet walls K of the end plate and the complementary end surface of the connector stud C. Prior to use within the gun the cartridge outlet opening in the plate 9 may be closed by a plug 11 of sheet metal adapted to frictionally engage with the walls of the opening.

The cartridge piston M may also be constructed of sheet metal conforming in contour to the adjacent and inner side of the head or end plate 9 and having its skirt 12 extending rearwardly and provided with a packing ring 13 disposed in an annular depression in its outer wall. The rearward end of the cylinder 8 may be rolled inwardly as shown at 15 to retain the piston M within the cartridge. Prior to use upon the gun the aperture N through the cartridge piston may be closed by a stamped metal cap 16, which, together with the plug cap 11 serves to render the cartridge fluid tight for shipment and storage by the consumer before it is used upon the gun.

The sealing mechanism H is preferably supplied as a part of the gun assembly as shown thus reducing the cost of the cartridge to a minimum, although if desired it may be supplied as a part of the cartridge in which case the packing material used would necessarily have to be of a cheaper grade to justify the inclusion of a sealing assembly for the piston with each cartridge purchase. Also the lugs 18 formed on the outer end of the plunger rod E would have to be dispensed with and same detachable lug means employed in their place in order to pass the plunger rod E through the sealing member. The function of the lugs 18, as shown, is to abut the adjacent end 19 of the rigid body 20 of the sealing mechanism and transmit thrust through the sealing member to the spring J upon the rearward movement of the rod E to compress the spring as during the removal and replacement of the cartridge. A latch 21 engageable with a groove 22 formed in the walls of the plunger rod E may be employed to hold the parts against movement under spring compression at such times as when the spring is compressed as described.

With reference to Fig. 3 the rigid member 20 of the sealing mechanism H presents a cylindrical mid portion adapted to enter the tubular and rearwardly extended wall 23 of the cartridge piston aperture N, a gasket 24 between the end of the wall 23 and a flange 25 formed on the member 20, and a packing gland 26 between the inner wall of the cylindrical portion of the member 20 and the plunger rod E having a laterally extending portion parallel with the rear face of the flange 25. The laterally extending portion of the gland 26 is arranged to be compressed between the flange 25 and a metal disk 27 slidably mounted upon the plunger E against which the spring J is arranged to bear. Both of the members 24 and 26 may be made of rawhide because of its wear resisting qualities and ability to retain its body in the presence of oils or other lubricants. As may be seen, in addition to providing a seal between the piston M and the plunger rod E, the sealing mechanism H serves to transmit thrust to the piston M from the spring J and in doing so to augment and maintain the sealing function of the sealing mechanism by compression of the washers 24 and 26 under said applied thrust.

In operation lubricant may pass directly from the cartridge into the high pressure cylinder B at each retractile movement of the piston F under the low pressure exerted thereupon by the spring J. During the pressure stroke of the gun the cylinder B will be closed by the presence of the piston F therein and lubricant in the cylinder B may be forced out through the gun nozzle 2.

When the contents of the cartridge has been exhausted the operator may draw rearwardly upon the hand grip 3 to cause the lugs 18 on the plunger E to engage with the adjacent face of the member 20 of the sealing mechanism H and thus transmit axial movement of the plunger rod through the sealing member 20 to the disk 27 which bears against one end of the spring J with the result that the spring may be compressed toward the cap D. When the groove 22 becomes in alignment with the latch 21 the latch will enter the groove to lock the plunger in its withdrawn position with the spring compressed and pressure upon the piston M thus relieved. The cap D with its associated gun parts E, F, H and J, respectively, may then be removed to permit the substitution of a fresh cartridge, or if desired the barrel 4 with the cap and associated parts may be unscrewed from the body A at 5.

During the operation of the gun, the cartridge piston M aside from maintaining a low pressure upon lubricant in the cartridge through the medium of the spring J, functions to aid in centering the plunger E within the gun so that registration between the piston F and cylinder B is facilitated. The depth of the stud C is such as to permit full range of movement of the piston M within the cartridge without limiting the gun piston stroke. If during the pumping action slight leakage may occur between the piston F and cylinder B it is apparent that such leakage will not result in loss of lubricant as it will only be returned to the cartridge or to that space within the stud C where it may be used during the next succeeding stroke.

In Fig. 4 there is shown a modified form of the sealing mechanism H wherein a lubricant tight seal is maintained between the rigid member 31 of the sealing assembly by metal to metal contact with the inner walls of the aperture N, the outer and contacting wall of the member 31 being slightly tapered to produce a tight fit under axial thrust of the spring J. A single packing washer 26 is employed and held securely in place within the member 31 by an inturned portion 32 thereof.

It should be understood that the embodiments of the invention herein set forth are presented for the purpose of illustration only, and various changes may be made without departing from the spirit of the invention and the scope of the appended claims.

I claim:

1. In combination, a lubricant gun having a high pressure cylinder, a lubricant cartridge having an outlet in one end, an apertured piston forming a movable end wall for the cartridge, means for mounting the cartridge upon the gun with its outlet in communication with said cylinder, a piston adapted for operation in said cylinder, a piston operating plunger extending through said cartridge and through said apertured cartridge piston, and means including separable telescopic members for establishing a lubricant tight seal between said cartridge piston and said plunger.

2. In combination, a lubricant gun having a high pressure cylinder, a lubricant cartridge having an outlet in one end, an apertured piston forming a movable end wall for the cartridge, means for mounting the cartridge upon the gun with its outlet in communication with said cylinder, a piston adapted for operation in said cylinder, a piston operating plunger extending through said cartridge and through said apertured cartridge piston, means including separable telescopic members for establishing a lubricant tight seal between said cartridge piston and said plunger and for guiding said plunger through said piston, and resilient means associated with said last named means for urging said piston toward said outlet end of the cartridge.

3. In combination, a lubricant gun having a high pressure cylinder, a cartridge comprising an original lubricant package for supplying lubricant to said cylinder when attached to said gun, a cartridge connector stud on said gun for establishing connection between said cartridge and said pressure cylinder, means whereby said cartridge and gun may readily be connected with and disconnected from one another, a high pressure piston arranged for operation in said cylinder and adapted to recede into said connector stud during its retractile stroke, and piston operating means extending longitudinally through said cartridge.

4. In combination, a lubricant gun having a high pressure cylinder, a cartridge comprising an original lubricant package for supplying lubricant to said cylinder when attached to said gun, a cartridge connector stud on said gun for establishing connection between said cartridge and said pressure cylinder, means whereby said cartridge and gun may readily be connected with and disconnected from one another, a high pressure piston arranged for operation in said cylinder and adapted to recede into said connector stud during its retractile stroke, a piston operating plunger extending longitudinally through said cartridge, and a cartridge piston mounted for reciprocation along said piston operating plunger.

5. In combination, a lubricant gun having a high pressure cylinder, a cartridge comprising an original lubricant package for supplying lubricant to said cylinder when attached to said gun, a cartridge connector stud on said gun for establishing connection between said cartridge and said pressure cylinder, means whereby said cartridge and gun may readily be connected with and disconnected from one another, a high pressure piston arranged for operation in said cylinder and adapted to recede into said connector stud during its retractile stroke, a piston operating plunger extending longitudinally through said cartridge, a cartridge piston mounted for reciprocation along said piston operating plunger, and means for establishing a lubricant tight seal between the piston and said plunger rod including a resilient member for urging said cartridge piston against the lubricant contents thereof.

6. In combination, a lubricant gun having a pressure cylinder one end of which comprises a discharge port, a high pressure piston adapted to enter the opposite end of said cylinder, a detachable lubricant cartridge comprising a commercial package of lubricant arranged in longitudinal alignment with said opposite end of the pressure cylinder and connecting therewith, piston operating means including a plunger rod mounted for reciprocation through the lubricant contents of said cartridge, and means including the cartridge and cylinder connection for holding said plunger rod in axial alignment with said cylinder.

7. In combination, a lubricant gun having a pressure cylinder one end of which comprises a discharge port, a high pressure piston adapted to enter the opposite end of said cylinder, a detachable lubricant cartridge comprising a commercial package of lubricant arranged in longitudinal alignment with said opposite end of the pressure cylinder and connecting therewith, piston operating means including a plunger rod mounted for reciprocation through the lubricant contents of said cartridge, and means including the cartridge and cylinder connection for holding said plunger rod in axial alignment with said cylinder, and a low pressure piston in said cartridge slidably mounted on said plunger rod.

8. In combination, a lubricant gun having a cartridge supporting body, a lubricant pressure pump including a member mounted for reciprocation, a lubricant cartridge arranged for detachable support on said body, a piston in said cartridge having an aperture therethrough, said reciprocable member being arranged to pass through said piston aperture when said cartridge is attached to said body, and a sealing member, slidably mounted on said member for closing said aperture and for providing a fluid tight seal between the piston and the reciprocable member.

9. In combination, a lubricant gun having a cartridge supporting body, a lubricant pressure pump including a member mounted for reciprocation, a lubricant cartridge arranged for detachable support on said body, a piston in said cartridge having an aperture therethrough, said reciprocable member being arranged to pass through said piston aperture when said cartridge is attached to said body, a sealing member slidably mounted on said member for closing said aperture and for providing a fluid tight seal between the piston and the reciprocable member, and resilient means bearing upon said sealing member for urging said piston forwardly of the cartridge through the medium of the sealing member.

10. In combination, a lubricant cartridge having an outlet opening and an apertured piston bearing upon the lubricant contents thereof, a lubricant gun having a pump cylinder and a piston mounted for reciprocation, means for mounting said cartridge upon said gun and for establishing connection between the cartridge outlet and said gun cylinder, means for closing and sealing the aperture in said cartridge piston including a spring for urging the piston forwardly of the cartridge.

11. In combination, a lubricant gun including a lubricant pump having a movable element, a cartridge adapted to be secured to said gun for supplying lubricant thereto, a piston in the cartridge having an opening therethrough, through which said movable element may extend, and means including a sealing member for urging said piston forwardly in said cartridge and for establishing a lubricant tight seal between the walls of said aperture and said movable element.

12. In combination, a lubricant gun including a pump having a movable element, a sealing member slidably mounted upon said movable element, a spring for urging said sealing member forwardly on said element, a lubricant cartridge for said gun, a piston in said cartridge having a central opening therethrough adapted to receive said sealing member to provide a seal between the piston and said movable element and to transmit the thrust of said spring to said piston, and means associated with the movable element for engaging with said sealing member upon movement of the element in one direction to relieve the pressure of said spring upon said piston.

13. In combination, a lubricant gun including a pump having a movable element, a sealing member slidably mounted upon said movable element, a spring for urging said sealing member forwardly on said element, a lubricant cartridge for said gun, a piston in said cartridge having a central opening therethrough adapted to receive said sealing member to provide a seal between the piston and said movable element and to transmit the thrust of said spring to said piston, and means associated with the movable element for engaging with said sealing member upon movement of the element in one direction to relieve the pressure of said spring upon said piston.

14. In combination, a cartridge having an outlet opening in one end, a piston in said cartridge having an opening therethrough in axial alignment with said outlet opening, a hollow body for receiving said cartridge having a pressure cylinder therein adapted for registration with the outlet of the cartridge, a piston adapted to reciprocate in said cylinder, a piston operating rod arranged to extend through said openings in said cartridge and cartridge piston, and means carried by said body at the rearward end thereof for supporting said operating rod in alignment with the openings in said cartridge and with said piston.

ADIEL Y. DODGE.